(No Model.)
L. J. J. AUBERT.
PLUMB LEVEL.
No. 555,489. Patented Mar. 3, 1896.
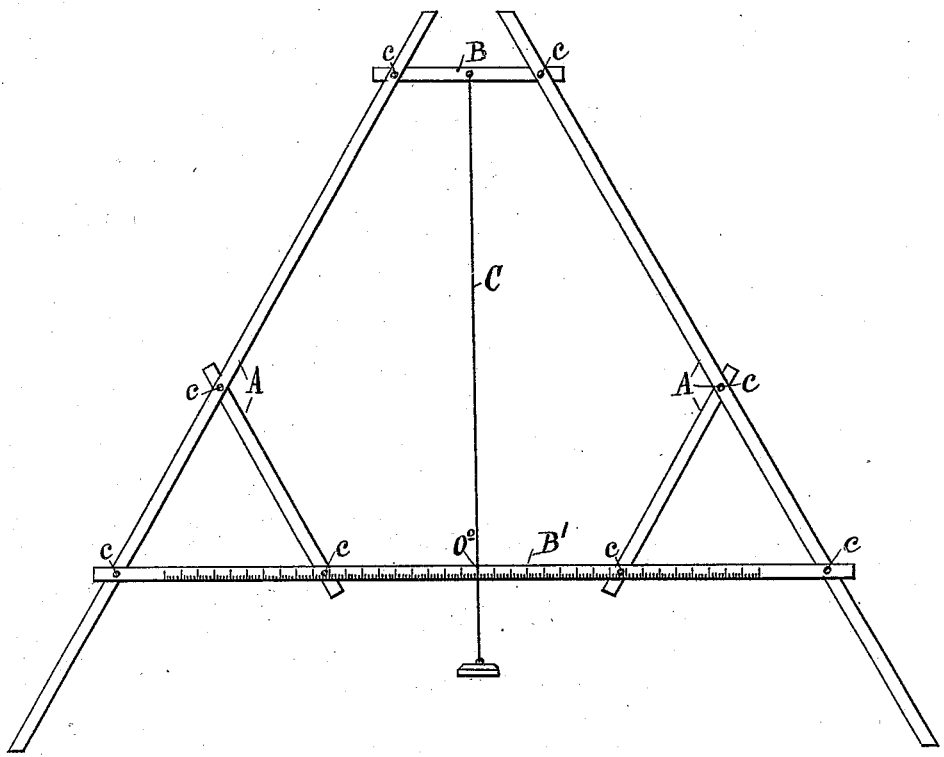
Witnesses:
O. Block.
J. Chebret.
Inventor:
Louis Jean Jacques Aubert,
By H. A. de Vos.
Attorney.

UNITED STATES PATENT OFFICE.

LOUIS JEAN JACQUES AUBERT, OF MOULIN, FRANCE.

PLUMB-LEVEL.

SPECIFICATION forming part of Letters Patent No. 555,489, dated March 3, 1896.

Application filed January 7, 1893. Serial No. 457,656. (No model.) Patented in France July 6, 1892, No. 222,799.

*To all whom it may concern:*

Be it known that I, LOUIS JEAN JACQUES AUBERT, a citizen of the French Republic, residing at Moulin, France, have invented certain new and useful Improvements in Plumb-Levels, (for which I have obtained a patent in France, dated July 6, 1892, No. 222,799,) of which the following is a description.

My invention has for its object to construct an improved plumb-level convenient and accurate in use and capable of being readily transported from place to place, in which the form and dimensions of the instrument are such that the inclination of the straight line is immediately shown by a simple reading of a graduated scale in centimeters and millimeters provided on the lower rod. A single man, however unskilled, can by means of this instrument perform all practical operations of the leveling.

In the annexed drawing, forming a part of this specification, I have illustrated my device.

The general form of the instrument is that of an isosceles trapezoid with acute angles of sixty degrees. It is constructed of rules A of strong wood of three centimeters width and twelve millimeters thickness. The joints are provided with iron bolts *c*, which makes them solid and allows of the instrument being taken apart for the sake of convenient transportation. A plumb-line C is fixed in the middle of the detachable upper rod, B, and upon the detachable lower rod, B', which is parallel to said rod B, is arranged in opposite direction a double scale, the zero being placed in the middle of the rod, and the plumb-line C strikes against this lower rod.

Having now described my invention, what I claim as new, and desire to secure by Letters Patent, is—

A plumb-level composed of the main rods A connected together at their upper ends by the detachable cross-rod B and at their lower ends by the detachable cross-rod B' parallel to said rod B and bearing a scale, the diagonally-extending brace-rods connecting the main rods A and the cross-rod B' at the opposite sides of the scale on said cross-rod, the plumb-line C secured at its upper end to the center of the cross-rod B and having its lower end extending below the scale carried by the cross-rod B' and means for securing said rods together at their points of intersection, substantially as and for the purposes described.

In testimony that I claim the foregoing I have hereunto set my hand this 14th day of December, 1892.

LOUIS JEAN JACQUES AUBERT.

Witnesses:
Z. T. MATRAY,
T. SALING.